(12) United States Patent
Dimitrova

(10) Patent No.: US 7,356,830 B1
(45) Date of Patent: Apr. 8, 2008

(54) METHOD AND APPARATUS FOR LINKING A VIDEO SEGMENT TO ANOTHER SEGMENT OR INFORMATION SOURCE

(75) Inventor: Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/351,086

(22) Filed: Jul. 9, 1999

(51) Int. Cl.
*H04N 5/455* (2006.01)
*H04N 7/173* (2006.01)

(52) U.S. Cl. .................. 725/51; 725/112; 382/190; 382/306

(58) Field of Classification Search ............... 725/9–20, 725/22, 37, 1, 111, 112, 51; 707/104, 5, 707/1, 6, 3, 4; 348/563; 382/190, 306
See application file for complete search history.

(56) References Cited

U.S. PATENT DOCUMENTS

| | | | | |
|---|---|---|---|---|
| 5,684,918 A | * | 11/1997 | Abecassis | 386/83 |
| 5,870,754 A | | 2/1999 | Dimitrova et al. | 707/104 |
| 6,400,890 B1 | * | 6/2002 | Nagasaka et al. | 386/69 |
| 6,463,444 B1 | * | 10/2002 | Jain et al. | 707/104.1 |
| 6,536,043 B1 | * | 3/2003 | Guedalia | 725/90 |
| 6,546,555 B1 | * | 4/2003 | Hjelsvold et al. | 725/1 |

(Continued)

FOREIGN PATENT DOCUMENTS

WO     WO9722201     6/1997

OTHER PUBLICATIONS

Hwang et al. "Multimedia Features for Course-on-Demand in Distance Learning", 1997 IEEE First Workshop on Multimedia Signal Processing, Cat No. 97$^{TH}$ 8256, pp. 513-518, NY, 1997 (Abstract).

(Continued)

*Primary Examiner*—Kieu-Oanh Bui
(74) *Attorney, Agent, or Firm*—Yan Glickberg

(57) ABSTRACT

A given video segment is configured to include links to one or more other video segments or information sources. The given video segment is processed in a video processing system to determine an association between an object, entity, characterization or other feature of the segment and at least one additional information source containing the same feature. The association is then utilized to access information from the additional information source, such that the accessed information can be displayed to a user in conjunction with or in place of the original video segment. A set of associations for the video segment can be stored in a database or other memory of the processing system, or incorporated into the video segment itself, e.g., in a transport stream of the video segment. The additional information source may be, e.g., an additional video segment which includes the designated feature, or a source of audio, text or other information containing the designated feature. The feature may be a video feature extracted from a frame of the video segment, e.g., an identification of a particular face, scene, event or object in the frame, an audio feature such as a music signature extraction, a speaker identification, or a transcript extraction, or a textual feature. The invention allows a user to access information by clicking on or otherwise selecting an object or other feature in a displayed video segment, thereby facilitating the retrieval of information related to that segment.

21 Claims, 3 Drawing Sheets

U.S. PATENT DOCUMENTS 6,553,178 B2 * 4/2003 Abecassis .................. 386/83

OTHER PUBLICATIONS

Kai et al., "TV Newspapers in ISDB-Multimedia Information Broadcasting Service", IEEE Transactions on Broadcasting, vol. 42, No. 3, pp. 187-193, Sep. 1996, (Abstract).

Forrester MA, "Hypermedia and Indexing: Identifying Appropriate Models from User Studies", Online Information 93 . . . 17th International Online Information Meeting Proceedings, pp. 313-324, Published, Oxford, UK, 1993 (Abstract).

Lewis et al., "Media-Based Navigation with Generic Links", AMC Conference on Hypertext, vol. conf. 7, Mar. 16, 1996, pp. 215-223, XP000724329.

Kate et al., "Trigg & Link A New Dimension in Television Program Making", Proceedings of the European Conference on Multimedia Applications, Services and Techniques, May 1997, p. 55, XP000668931.

Correia et al., "The Role of Analysis in Content-Based Video Coding and Indexing—Image Communications", Signal Processing, European Journal Devoted to the Methods and Applications of Signal Processing, NL, Elsevier Science Publishers B.V. Amsterdam, vol. 66, No. 2, pp. 125-142, Apr. 1998, XP004129637.

Ariki et al., "A TV News Retrieval System with Interactive Query Function", Proceedings of the IFCIS International Conference on Cooperative Information Systems, COOPIS, Jun. 1997, pp. 185-186, XP000197416.

Shahraray et al., "Pictorial Transcripts: Multimedia Processing Applied to Digital Library Creation", 1997 IEEE First Workshop on Multimedia Signal Processing, Proceedings of First Signal Processing Society Workshop on Multimedia Signal Processing, USA, Jun. 1997, pp. 581-586, XP002153593.

"Hyperlinked Video" by J. Dakss et al., Proc. SPIE Multimedia Systems and Applications, vol. 3528, pp. 2-10, Jan. 1999.

"Adding Hyperlinks To Digital Television", by V.M.Bove, Jr. et al., Proc. 140th SMPTE Technical Conference, Pasadena, CA, Oct. 1998.

Dimitrova et al., "Color SuperHistograms For Video Representation", Proceedings of the 1999 Int'l Conference on Image Processing, Kobe Japan (Oct. 24-28, 1999), IEEE Computer Soc. 1999, vol. III, pp. 314-318.

Dimitrova et al., "Video Keyframe Extraction and Filtering: A Keyframe Is Not A Keyframe To Everyone", Proc. Of the Sixth Int'l Conference on Information and Knowledge Management, Las Vegas, NV (Nov. 10-14, 1997), ACM 1997, pp. 113-120.

* cited by examiner

METHOD AND APPARATUS FOR LINKING A VIDEO SEGMENT TO ANOTHER SEGMENT OR INFORMATION SOURCE

FIELD OF THE INVENTION

The present invention relates generally to video signal processing, and more particularly to techniques for processing digital video streams or other types of video segments.

BACKGROUND OF THE INVENTION

Conventional techniques for processing video segments in hypermedia documents and other similar applications generally provide only a very limited level of video-based interactivity. Although hypermedia documents such as web pages often include links to various video segments, such documents are primarily text-based, and typically utilize images and video merely as illustrative entities.

An example of one such conventional video processing system is the Video Mosaic (Vosaic) system described in PCT Application No. WO 97/22201. The Vosaic system incorporates real-time video into standard hypertext pages, and utilizes a video datagram protocol (VDP) for handling the transmission of the real-time video over the Internet or other type of network. The VDP is designed to minimize inter-frame jitter and dynamically adapts to the client CPU load and network congestion. In Vosaic, the video information is streamed across the network from a server to a client in response to a client request for a web page containing embedded videos. The Vosaic system provides several classes of so-called meta-information which include hierarchical information, semantic description, as well as annotations that provide support for hierarchical access, browsing, searching and dynamic composition of video information.

However, the interactivity provided by the Vosaic system and other similar conventional systems remains unduly limited. More specifically, these systems generally fail to provide simultaneous access to information which is associated with the video segment. Another drawback is that such systems generally do not allow links to appear and disappear as the video progresses. In addition, links in the conventional systems typically provide a Uniform Resource Locator (URL) including an address or physical location of a file or other document, but generally do not provide significant additional information about the link itself. Furthermore, the conventional system links are generally a 1:1 mapping between the link and the file or other document.

As is apparent from the above, a need exists for video processing techniques which can provide users with improved video-based interactivity, without the limitations associated with the above-noted conventional systems.

SUMMARY OF THE INVENTION

In accordance with the invention, a video segment is configured to include links to one or more other video segments or information sources. The video segment is processed in a video processing system to determine an association between an object, entity, characterization or other feature of the segment and at least one additional information source containing the same feature. The association is then utilized to access information from the additional information source, such that the accessed information can be displayed to a user in conjunction with or in place of the original video segment. A set of associations for the video segment can be stored in a database or other memory of the processing system, or incorporated into the video segment itself, e.g., in a transport stream of the video segment. The additional information source may be, e.g., an additional video segment which includes the designated feature, or a source of audio, text or other information containing the designated feature. The feature may be a video feature extracted from a frame of the video segment, e.g., an identification of a particular face, scene, event or object in the frame, an audio feature such as a music signature extraction, a speaker identification, or a transcript extraction, or a textual feature.

In one embodiment of the invention, a user accesses additional related information by clicking on or otherwise selecting an object or other feature in a displayed video segment. In another possible embodiment, information in the video segment itself may be used to automatically retrieve the related information in accordance with factors such as video segment content, established user preferences, time of day, etc.

The invention provides a number of advantages over conventional video processing systems. For example, the invention provides improved interactivity by allowing a user to access a wide variety of information associated with objects, entities, characteristics or other features of a given video segment. In addition, the links are dynamic, e.g., the links may appear, disappear or otherwise change within a given video segment. Other links can be made available throughout the entire segment, e.g., textual links such as the title, director, style, genre, etc. Another advantage is that a given link can also contain information about the nature of the link itself, rather than simply a URL with the address or the physical location of a file or a document. A further advantage is that different links can be generated based on factors such as context, user, time, location, etc. Moreover, the links can be used to implement a m:n mapping between m objects, entities, characteristics or other features in a given video segment, and the n video segments or other information sources that can be accessed from the m features. This is a significant improvement over the typical 1:1 mapping of conventional hypermedia documents. These and other features and advantages of the present invention will become more apparent from the accompanying drawings and the following detailed description.

DETAILED DESCRIPTION OF THE INVENTION

Figure 1:
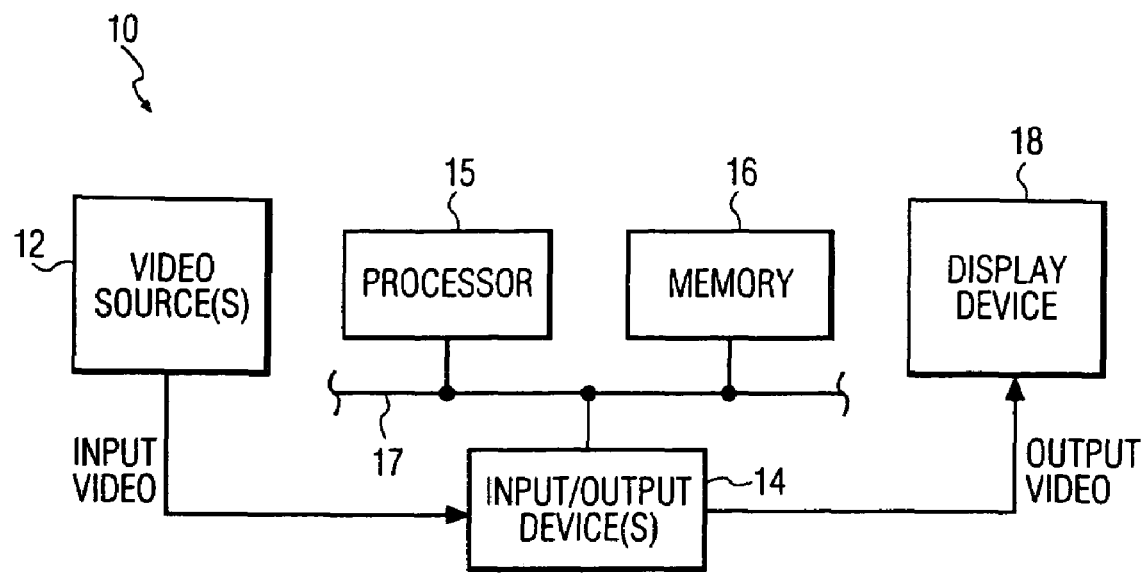
FIG. 1 is a block diagram of a video processing system in which the invention may be implemented.

FIG. 1 shows a video processing system 10 in which the present invention may be implemented. The system 10 may represent a desktop, laptop or palmtop computer, a personal digital assistant (PDA), a television, or a set-top box, as well as portions or combinations of these and other devices. The system 10 includes one or more video sources 12, one or more input/output devices 14, a processor 15 and a memory 16. The input/output devices 14, processor 15 and memory 16 communicate over a communication medium 17. The communication medium 17 may represent, e.g., a bus, a communication network, one or more internal connections of a circuit, circuit card or other device, as well as portions and combinations of these and other communication media.

Input video from the source(s) 12 is processed in accordance with one or more software programs stored in memory 16 and executed by processor 15 in order to generate output video which is supplied to a display device 18, which may be, e.g., a television display, a computer monitor, etc. The video source(s) 12 may represent one or more network connections for receiving video from a server or servers over a global computer communications network such as the Internet, a wide area network, a metropolitan area network, a local area network, a terrestrial broadcast system, a cable network, a satellite network or a telephone network, as well as portions or combinations of these and other types of networks or systems.

It should be understood that the particular configuration of system 10 as shown in FIG. 1 is by way of example only. In other embodiments of the invention, one or more of the video processing operations to be described in detail herein may be implemented in a distributed manner, e.g., distributed across multiple computers or other devices in a network, or in a wide variety of other alternative configurations.

The present invention provides a video processing framework, also referred to as "DejaVideo," that may be implemented in the system 10 of FIG. 1. This video processing framework enables a given system user to access video segments, text or other multimedia documents based on a set of associations established for objects, audio or other features in a video segment that the user is currently viewing. The invention thus allows the user to explore interactively new content in other video segments, e.g., by finding similarity with something that the user has already seen or heard. It can also provide additional information about objects seen in a currently-viewed video segment, e.g., by incorporating textual or other information in a graphics overlay mode or other type of display mode. A smooth transition from one scene in a video segment to another scene in another video segment can be performed through well-known conventional visual effects such as image morphing.

A preferred embodiment of the invention includes the following four main elements:

1. Links. A link defines a physical relationship between two entities or other features. For example, an object O1 with a centroid positioned at coordinates x=150, y=20 with a bounding box width=50, height=60 in frame 12373 in a video segment news1.mpg is linked to frame 1045 in a video segment news143.mpg.

2. Associations. An association generally includes information describing a corresponding physical link that is created between two entities or other features. For example, there may be a semantic relation between two entities, e.g., the facial features of a given actor and a video clip where the actor's name is mentioned. In this case, the association may include information describing how and why the link was created. As another example, if the link is based on visual similarity between two video segments from two different movies, the corresponding association may define the percentage of similarity, duration, etc.

It should be noted that the term "association" as used herein is intended to refer more generally to any type of information which identifies or otherwise characterizes a link or other relationship between a given feature in a video segment and a related feature in another segment or other information source. For example, depending on the application, the term "association" as broadly defined herein may include no additional information other than the previously-described physical link itself.

3. Transformation and interaction mode during display to connect the two related entities or other features. For example, morphing between frames of video A to video B, overlay of linked text, URL, image or narrative information to a current video, display in another window, store related information for later viewing, etc.

4. Additional factors such as context, user, time, etc. Based on the program that is currently displayed, i.e., the category of content of that program, there could be different links active to other content. For example, during broadcast of a documentary program, links to an encyclopedia could be active. During a commercial, links to related products or closest store could be active. Based on the background of the user, e.g., age, gender, interests, etc., different links can be activated. Also, at certain times of the day the preferred mode of interaction and transformation could change based on stored user preferences.

Although the preferred embodiment of the invention includes each of the above-described basic elements, other embodiments of the invention may be based on all or a subset of these elements.

The above-described associations used to describe links between a given video segment and one or more other video segments or information sources can be created in a variety of different ways, including the following:

1. Visual Similarity. Associations may be established based on similarity in the visual appearance of frames. This visual similarity can be based on, e.g., color, shape, particular object similarity, or a conceptual type of object similarity, and may be, e.g., two-dimensional, 2.5-dimensional, i.e., computer vision, or three-dimensional. The associations can be determined in this case using content-based feature extraction, such as that described in greater detail below in conjunction with FIG. 4. Additional details regarding techniques for extracting visual similarity between video sequences may be found in, e.g., U.S. Pat. No. 5,870,754 issued Feb. 9, 1999 in the name of inventors Nevenka Dimitrova and Mohamed Abdel-Mottaleb, and entitled "Video Retrieval of MPEG Compressed Sequences Using DC and Motion Signatures."

2. Scene Similarity. For example, a beach scene can be used to provide a link to video segments with similar beach scenes. The association in this case may be based, e.g., on a thesaurus with keywords contained in particular video scenes.

3. Event Similarity. For example, a wedding event in a given video segment can link access to wedding video segments. An event association can be determined by using similar features, such as fast motion, action or a set of keywords. Event associations can also be established using, e.g., a combination of low level features and semantic features represented by concepts.

4. Textual Similarity. Associations may be established through, e.g., a text transcript or recognized characters in title credits. The associations in this case may be derived using, e.g., statistical text indexing methods. As another example, the associations can be derived using plain keywords or using concept thesauri where a keyword is associated with its closest concepts.

5. Spoken Word Similarity. A particular concept associated with a spoken word or a sound of particular kind can provide a link to another video segment which has that similar word or sound. In this case, speech-to-text conversion may be used as a basis for establishing the associations, although the actual links may be based on the spoken words themselves.

6. Voice Similarity. Certain characteristics of the voice of a particular actor or celebrity can be used to provide a link with other video segments containing the same or similar voice. As another example, an auditory event which is characterized with a specific energy, bandwidth, pitch or other characteristic can be used to provide a link with other similar audio events.

7. Multiple Types. Combinations of the above-described associations may also be used. For example, the sound of streaming water combined with redness and the word "canyon" in a video segment of a nature movie can provide a link to video segments of hiking trips, or to web pages of hiking equipment. As another example, a user clicking on or otherwise selecting a particular actor's face in a given video segment may be provided with the actor's name and be linked to the actor's personal web page.

8. Association Similarity. If video A and video B have similar associations to video C, then videos A and B may each inherit all the associations from videos A and B (or a suitable combination or subset of their associations).

Well-known feature extraction methods may be used to compute one-dimensional or multi-dimensional feature vectors in implementing the above-described associations. For example, the invention can utilize conventional methods for feature classification and clustering as well as methods for similarity computation (or distance computation, where distance=1−similarity) to determine associations between video features. In the case of video and audio similarity, the invention can extract feature vectors and compute similarity using standard distance measures such as L1, L2, chi-square, etc. Frame similarity can be computed based on frame histograms using, e.g., the techniques described in N. Dimitrova, J. Martino, L. Agnihotri and H. Elenbaas, "Color Super-histograms for Video Representation," IEEE International Conference on Image Processing, Kobe, Japan 1999. Another known method for determining frame similarity, using discrete cosine transform coefficients, is described in N. Dimitrova, T. McGee and H. Elenbaas, "Video Keyframe Extraction and Filtering: A Keyframe is not a Keyframe to Everyone," Proceedings of ACM Conference on Information and Knowledge Management, November 1997.

As will be described in greater detail below, information relating to these associations and the corresponding links could be implemented, e.g., as part of a digital video stream or stored in a separate database or other type of system memory.

In accordance with the invention, each video segment may be considered a hyperdocument. For example, the text appearing in the images can be treated as a link to an encyclopedia, or as a query to an on-line newspaper or other information source. Any static or moving object within a given video segment can be a link to another video segment or information source. For example, from a currently-viewed video segment which contains an image of a particular actor, a user can access another video segment associated with that actor. In a similar manner, all the other entities, events, current stories or other features of the currently-viewed video segment may be links to other video segments or information sources containing related features. These links can allow, e.g., a particular character in a movie to be associated with all the other experiences or "memories" of that character as accumulated in other movies, documents, etc.

Figure 2:
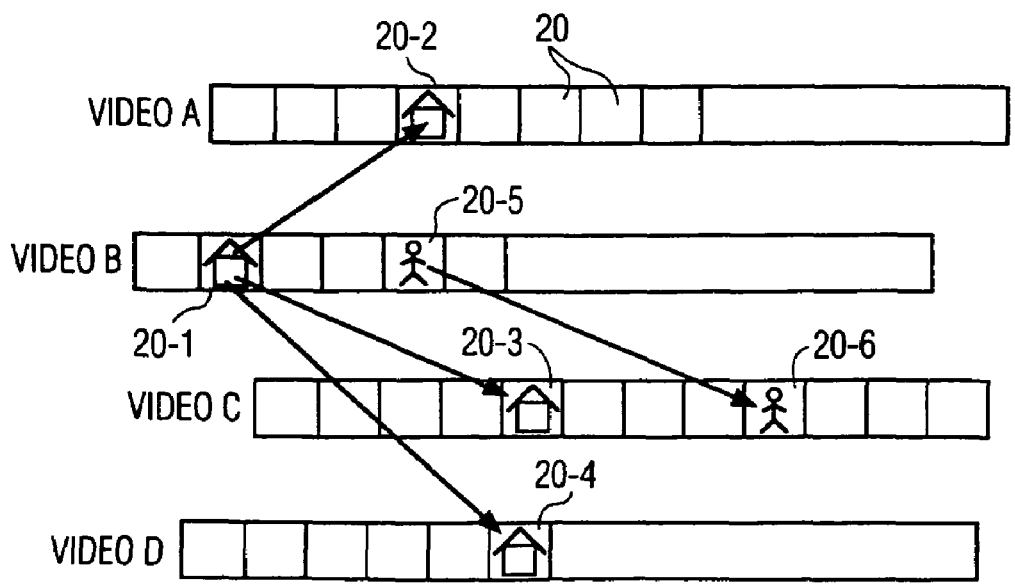
FIG. 2 illustrates linking between multiple video segments in an illustrative embodiment of the invention.

FIG. 2 shows an example of linking between video segments in an illustrative embodiment of the invention. The FIG. 2 example includes four interrelated video segments, denoted Video A, Video B, Video C and Video D. Each of the video segments comprises a number of frames 20. In accordance with the invention, a link is established between certain of the frames in a given video segment, and other similar frames in other video segments. More particularly, frame 20-1 of Video B is linked to similar frames 20-2 of Video A, 20-3 of Video C, and 20-4 of Video D, based on visual similarity between the frames, e.g., the presence of a house in each frame. In a like manner, frame 20-5 of Video B is linked to similar frame 20-6 of Video C, again based on visual similarity between the frames, e.g., the presence of the same actor or other individual in each frame.

It should be noted that the term "video segment" as used herein is intended to include a frame, a set of frames, or any other portion of a video signal, including an audio portion of a given video signal. Different video segments may, but need not, be portions of different video signals. For example, two or more of the video segments illustrated in FIG. 2 may represent distinct portions of the same video signal.

Figure 3:
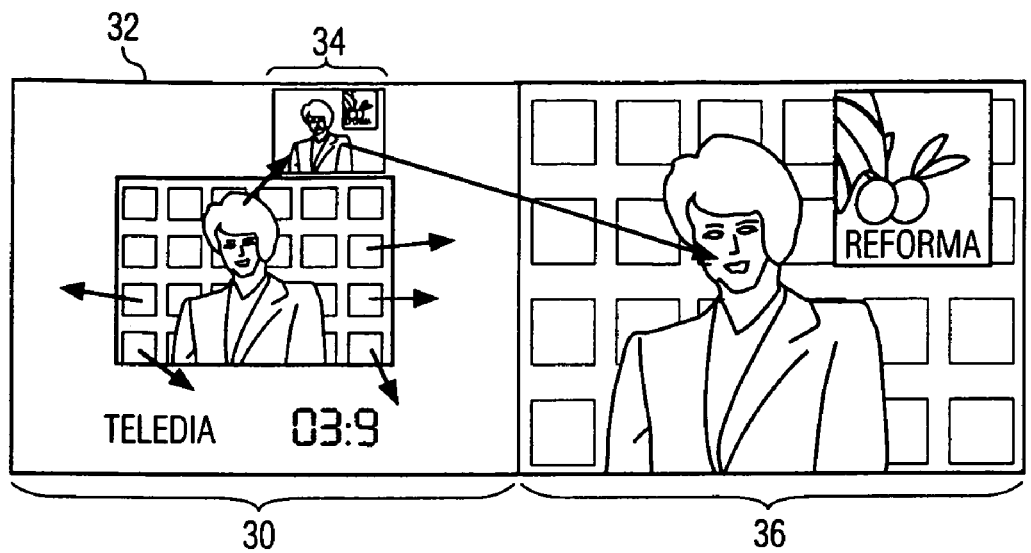
FIG. 3 shows an example of a user interface including portions of actual video segments with linking in accordance with the invention.

FIG. 3 shows an example of a user interface which may be utilized to implement linking between video segments in accordance with the invention. In this example, a video frame 30 includes a main window 32 and a number of secondary windows, such as window 34, arranged around the main window 32. In accordance with the invention, each of the secondary windows of frame 20 has some relation to the display in the main window 32. These relations are shown by small arrows in the frame 30. For example, window 34 includes an image of the same anchorperson appearing in the main window 32. This image may be a frame of another video segment of a different newscast by the same anchorperson.

A user can link to the video segment corresponding to window 34 by entering an appropriate selection command in the system 10, such that the currently-displayed video segment becomes the segment including frame 36 that had previously been displayed in secondary window 34 of frame 30. It should be noted that many other types of user interface arrangements may be used to provide linking between a given video segment and other video segments or information sources in accordance with the invention. For example, since the link can be based on a visual, auditory or conceptual association, the interface could be displayed in a variety of different manners to accommodate various pointing devices, e.g., on-screen arrows controlled by a remote control, a mouse or other point-and-click device.

Figure 4:
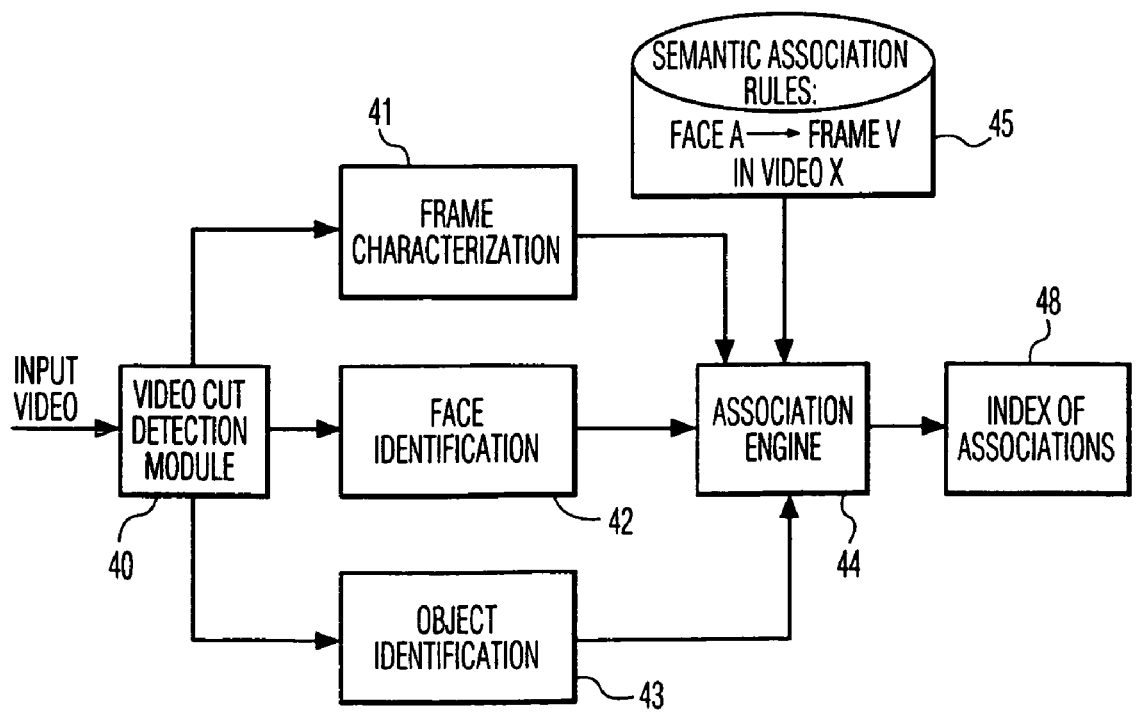
FIGS. 4 and 5 illustrate extraction from one video segment of associations with other video segments, in illustrative embodiments of the invention.

FIG. 4 illustrates the manner in which associations with other video segments can be extracted from a given video segment using the techniques of the invention, e.g., as previously described above in conjunction with associations based on visual similarity. Input video is initially processed in a conventional video cut detection module 40, the operation of which is well known in the art. The resulting output of the cut detection module 40 is then further processed to extract semantically meaningful features that will be used to form associations. Each frame in the given video segment is generally characterized by a set of video features based on color, texture, shapes, etc. Regions of the frames of the video segment are processed to detect these features.

The video feature detection in this example is based on frame characterization 41, face identification 42 and object identification 43. The detected features are then processed in an association engine 44 using semantic association rules stored in a rules database 45. For example, a given one of the association rules in database 45 indicates that Face A, e.g., the face of a particular actor or celebrity, is to be associated with Frame V in Video X. One or more other video segments are then processed in a similar manner to detect the same features. The output of the association engine 44 is one or more associations that are stored in an index of associations 48, and which indicate the frames of multiple video segments in which a particular video feature appears.

The semantic association rules in rules database 45 may include information describing how to associate facial features, e.g., a given so-called eigen face vector, with a particular person's name. These rules can evolve and change over time through the use of learning algorithms, e.g., neural networks. In this case, an initial set of rules may be established by a system designer when the system is set up, and the system can then add new face-name associations on its own once a sufficient database of face and name information is accumulated.

Figure 5:
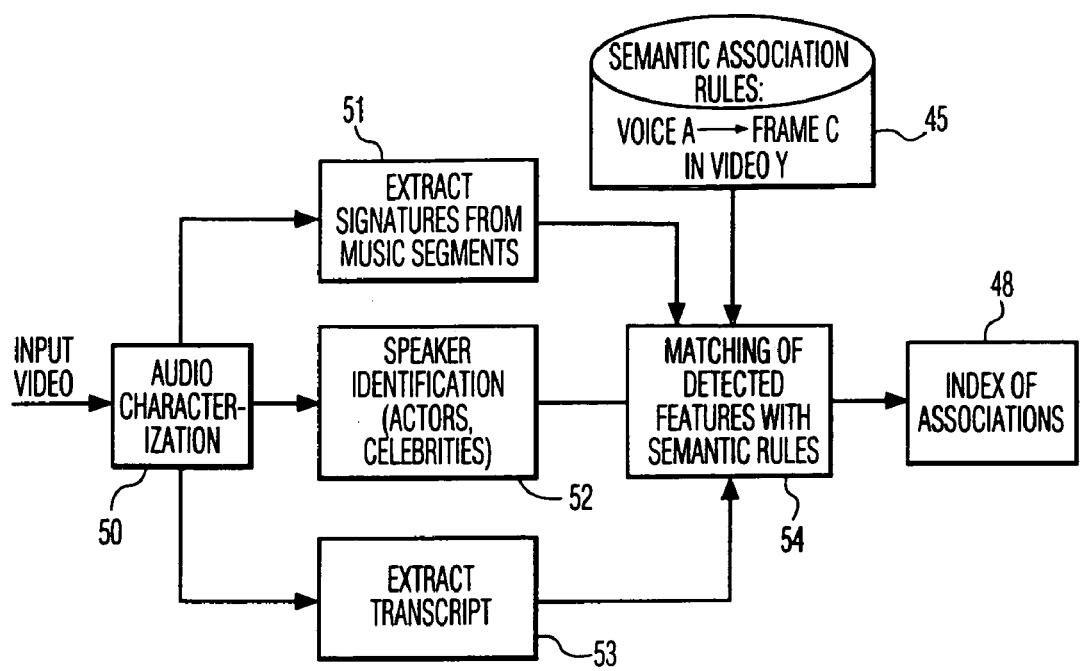

A similar approach, illustrated in FIG. 5, can be used to extract associations based on audio features such as music, familiar voice and word associations. In this case, the input video is processed in an audio characterization module 50 to segment the audio portions thereof into categories such as single-voice speech, multiple-voice speech, music, silence and noise. Each frame in the given video segment is generally characterized by a set of audio features such as mel-frequency cepstrum coefficients (MFCC), Fourier coefficients, fundamental frequency, bandwidth, etc. The frames of the video segment are processed to detect these audio features.

The audio feature detection in this example is based on music segment signature extraction 51, speaker identification 52, and transcript extraction 53. The detected audio features are then processed in a matching operation 54 which attempts to match the detected audio features with rules from the semantic association rules database 45. For example, a given one of the semantic association rules in database 45 indicates that Voice A, e.g., the voice of a particular actor or celebrity, is to be associated with Frame C in Video Y. One or more other video segments are then processed in a similar manner to detect the same audio features. The output of the matching operation 54 is one or more additional associations that are stored in the index of associations 48, and which indicate the frames of multiple video segments in which a particular audio feature appears.

Figure 6:
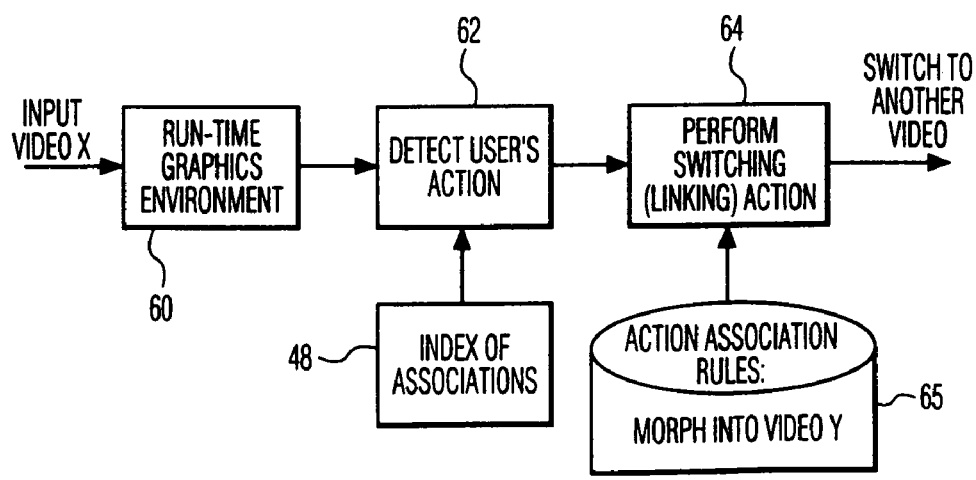
FIG. 6 illustrates run-time linking and switching in an illustrative embodiment of the invention.

FIG. 6 illustrates run-time linking and switching in an illustrative embodiment of the invention, based on the associations determined, e.g., in the manner described in FIGS. 4 and 5. As a user-views a given video segment, i.e., Video X, a run-time graphics environment 60 monitors the user's actions. If an object in the video segment is "activated," e.g., clicked on or otherwise selected by the user, this action is detected in a detection operation 62. The index of associations 48 is then looked up for that object and the appropriate video switching action 64 is performed, based on a database of action association rules 65. For example, if the index of associations 48 indicates that there is another video segment similar to the selected object in Video X, e.g., a similar video segment Video Y with similar frame content, the action may be to morph the currently-viewed Video X into Video Y. The system thus switches to Video Y based on the object selected by the user in Video X. As previously noted, a smooth transition from one scene in a video segment, i.e., video X, to another scene, i.e., Video Y, can be performed through well-known conventional visual effects such as image morphing.

It should be noted that the run-time linking and switching as illustrated in FIG. 6 may be implemented in either an active mode or a passive mode. In the active mode, the linking and switching is based on an actual selection actively made by the user, e.g., by the user clicking on or otherwise selecting a given feature in a video segment. In the passive mode, cues or other suitable information identifiers contained in the video segment itself or stored elsewhere in the system may be used to automatically activate the retrieval of linked information for display, e.g., in a PIP or other window of the display.

In other embodiments of the invention, there need not be a switch between the currently-viewed video segment and another video segment or information source. For example, if the selected link is to information in textual form, that information could be displayed in an overlay mode, e.g., over the video, above the selected object or in a separate box of arbitrary shape. In one particular implementation of this type, a selected link may trigger retrieval of one or more hypertext documents available over the Internet or other network. As another example, if the selected link is to auditory information, then the auditory information could be mixed in with the audio signal of the currently-viewed video segment, or transcribed in a textual format and displayed along with the video segment. In addition, if the link is to another video segment, that segment can be displayed in a separate window of the display, e.g., in a picture-in-picture (PIP) window, concurrently with the currently-viewed video segment, rather than as a substitute for the currently-viewed video segment.

Additional details regarding particular implementations of the invention will now be described. In accordance with the invention, an MPEG video bitstream or other type of video segment can be enhanced with associations which associate similarity values or other information between the frames of the video segment and the frames of other video segments. It is possible to insert these associations in the MPEG bitstream in the user data field or in the transport stream. In this enhanced bitstream implementation, a video encoder performs calls, e.g., to an appropriately-configured DejaVideo execution engine, whenever the encoder encounters a designated code in the user data field. Such an execution engine can be configured in a straightforward manner to follow and accept user inputs, to execute access to links as selected by the user, and to perform the display of the information in the selected links. For non-MPEG streams, a transport layer containing the associations could be created around the video segment.

Another possible implementation involves creating a separate database which contains the associations, the method of interaction, and the method of display of the new content, i.e., the destination content identified by a particular link. During video playback, a temporal counter reference may be kept with respect to the corresponding links, in order to provide a temporal mask which enables certain commands or links only during the corresponding frames. In such an implementation, available video segments or other information source identified by the links may be stored in the database, or may be stored on remote machines accessible by URL or other suitable identifier.

A given video segment configured in accordance with the invention may therefore include information such as the above-noted associations; pointing manner, i.e., method of selecting objects or other features in the video segment;

method of display of the linked information; method of transformation of the linked information, i.e., overlay, PIP, etc.; location specifiers for light-weight targets, e.g., text or a web page, and for heavy-weight targets, e.g., other video segments; and context functions for use by the associations in determining links based on additional information about the user, e.g., user profile, location, time, preferences, etc.

The linking techniques of the invention are particularly well-suited for use in applications such as video search and browsing, as well as in content creation, e.g., in video editing software, games, etc. The following are examples of specific video processing applications in which the invention may be utilized:

1. Content Authoring Tool. Such a tool is used to create video material from existing material even if there is no adequate raw footage, and to provide access to video objects in different environments.

2. Video Access. The invention can be used in television browsing, surfing and other types of video access techniques. For example, a user can utilize the established links to access a wide array of information related to a currently-viewed video segment, e.g., all other movies or programs containing scenes similar to a particular scene of interest in the currently-viewed video segment. The invention provides interactive relationships between video and other information content such that accessing information is considerably facilitated.

3. Video Archive Exploration. The invention can be used to link videos in video stores, film archives or other types of video archives, based on features such as genre, director, actor, events, scenes, etc. The links can lead users to other videos that could be rented or to other information channels such as web pages associated with particular actors or movie fan groups.

4. Web-Based Video Browsing. The invention can be used to access web documents based on linked objects in a currently-viewed video segment.

5. Educational Tool. While watching an educational video, children can click on a particular object and receive similar videos or web pages with conceptually related information.

The invention provides a number of advantages over conventional video processing systems. For example, the invention can provide simultaneous access to a wide variety of information which is associated with objects, entities, characteristics or other features of a given video segment. In addition, the links are dynamic, e.g., the links may appear, disappear or otherwise change within a given video segment. Other links can be made available throughout the entire segment, e.g., textual links such as the title, director, style, genre, etc.

Another advantage is that a given link can also contain information about the nature of the link itself, rather than simply a URL with the address or the physical location of a file or a document. For example, in a documentary movie about a particular geographic region, a user can get information about the population, birth rate, or brief history of the region by, e.g., pointing to a map in the background of a given frame.

A further advantage is that different links can be generated based on factors such as context, user, time, location, etc. For example, links for a child and an adult could be completely different.

Moreover, the links can be used to implement a m:n mapping between m objects, entities, characteristics or other features in a given video segment, and the n video segments or other information sources that can be accessed from the m features. This is a significant improvement over the typical 1:1 mapping of conventional hypermedia documents.

The above-described embodiments of the invention are intended to be illustrative only. For example, the invention can be used to implement other types of video linking, in any desired type of video processing system or device, and in many applications other than those described herein. The invention can also be implemented at least in part in the form of one or more software programs which are stored in an otherwise conventional electronic, magnetic or optical storage medium or other type of memory and executed by a suitable microprocessor, central processing unit, application-specific integrated circuit (ASIC) or other type of processor. For example, such programs may be stored in memory 16 and executed by processor 15 in the system 10 of FIG. 1. These and numerous other embodiments within the scope of the following claims will be apparent to those skilled in the art.

What is claimed is:

1. A method for processing video, the method comprising:
    displaying a sequence of video segments at a display of a user,
    extracting a feature from one or more video segments of the sequence,
    determining an association between the feature and at least one additional information source also including that feature; and
    defining a link between the feature and the at least one additional information source to facilitate a display of information from the additional information source based at least in part on a selection by the user of the feature while the one or more video segments are displayed to the user.

2. The method of claim 1 wherein
    defining the link includes retrieving the link from a memory based on an identification of the feature.

3. The method of claim 1 wherein
    the additional information source includes an additional video segment that also includes the feature.

4. The method of claim 3, including
    switching from display of the first video segment to display of the additional video segment.

5. The method of claim 3, including
    displaying the additional video segment at least in part in a separate portion of a display which also includes at least a portion of the one or more video segments.

6. The method of claim 1 wherein
    the feature includes a video feature.

7. The method of claim 6 wherein
    the video feature includes at least one of:
        a frame characterization,
        a face identification,
        a scene identification,
        an event identification, and
        an object identification.

8. The method of claim 1 wherein
    the feature includes an audio feature.

9. The method of claim 8, including
    combining an audio signal corresponding to the audio feature with an audio signal associated with the first video segment.

10. The method of claim 8, including
    converting an audio signal corresponding to the audio feature into a textual format that is displayed with the first video segment.

11. The method of claim 8, including
separating at least a portion of the video segment into audio categories including one or more of:
single-voice speech,
multiple-voice speech,
music,
silence, and
noise,
in order to extract the audio feature therefrom.

12. The method of claim 8, wherein
the audio feature includes at least one of:
a music signature extraction,
a speaker identification, and
a transcript extraction.

13. The method of claim 1, wherein
the feature is a textual feature.

14. The method of claim 13, including
displaying information corresponding to the textual information as an overlay on a display of the first video segment.

15. The method of claim 1, wherein
the feature includes at least one multi-dimensional feature vector extracted from a portion of the video segment using a feature extraction technique.

16. The method of claim 1, wherein
determining the association includes determining a similarity measure using a clustering technique.

17. The method of claim 1, including
storing the link to facilitate subsequent display of the information from the additional information source.

18. The method of claim 1, including
combining the link and the video segment to create a hyperlinked video segment.

19. An apparatus comprising:
a display that is configured to display a sequence of video segments,
a processor that is configured to:
extract a feature from one or more video segments of the sequence;
determine an association between the feature and at least one additional information source also including that feature; and
direct the display of information from the additional information source based at least in part on a selection by a user of the feature in the first video segment while the one or more video segments are displayed on the display.

20. An apparatus for processing video, the apparatus comprising:
a processor operative to:
determine an association between a feature in one or more video segments and at (east one additional information source that also includes the feature; and
display information from the additional information source based at least in part on a selection by a user of the feature while the one or more video segments are displayed to the user.

21. An article of manufacture comprising a machine-readable medium containing one or more software programs which when executed:
display a sequence of video segments,
extract a feature from one or more video segments of the sequence,
determine an association between the feature and at least one additional information source that also includes the feature; and
display information from the additional information source based at least in part on a selection by a user of the feature while the one or more video segments are displayed to the user.

* * * * *